(12) United States Patent
Jin et al.

(10) Patent No.: US 11,322,941 B2
(45) Date of Patent: May 3, 2022

(54) METHOD FOR CONTROLLING ESS OUTPUT

(71) Applicant: HYOSUNG HEAVY INDUSTRIES CORPORATION, Seoul (KR)

(72) Inventors: Dae Geun Jin, Incheon (KR); Bo Gun Jin, Anyang-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 196 days.

(21) Appl. No.: 16/646,306

(22) PCT Filed: May 25, 2018

(86) PCT No.: PCT/KR2018/005994
§ 371 (c)(1),
(2) Date: Mar. 11, 2020

(87) PCT Pub. No.: WO2019/059491
PCT Pub. Date: Mar. 28, 2019

(65) Prior Publication Data
US 2020/0287385 A1    Sep. 10, 2020

(30) Foreign Application Priority Data

Sep. 25, 2017 (KR) .................. 10-2017-0123609

(51) Int. Cl.
*H02J 3/24* (2006.01)
*H02P 9/14* (2006.01)

(52) U.S. Cl.
CPC . *H02J 3/24* (2013.01); *H02P 9/14* (2013.01)

(58) Field of Classification Search
CPC ...... H02J 3/24; H02J 3/48; H02J 3/003; H02J 3/32; H02J 3/38; H02J 3/381; H02P 9/14;
(Continued)

(56) References Cited

U.S. PATENT DOCUMENTS

2005/0077881 A1* 4/2005 Capp .................. H02J 3/30
322/29
2011/0077792 A1  3/2011 Shimoda et al.
(Continued)

FOREIGN PATENT DOCUMENTS

JP      2015-195578 A     11/2015
KR  10-2010-0064492 A      6/2010
(Continued)

*Primary Examiner* — Rexford N Barnie
*Assistant Examiner* — Thai H Tran
(74) *Attorney, Agent, or Firm* — Novick, Kim & Lee, PLLC; Jae Youn Kim (57) ABSTRACT

A method of controlling output of an ESS depending on droop control according to frequency variation range of a power grid in the present invention may comprise steps of: monitoring the frequency variation range of the power grid; predicting frequency correction range resulting from regulation of an engine generator during a predetermined unit regulation time if the frequency variation range is determined to exceed a first reference value; controlling the output of the ESS with an output value determined by a frequency of the power grid according to a droop control algorithm set as a default if the predicted frequency correction range does not exceed a second reference value; and fixing the output of the ESS during the unit regulation time if the predicted frequency correction range exceeds the second reference value.

9 Claims, 5 Drawing Sheets

(58) Field of Classification Search
CPC .......... Y04S 10/50; Y04S 10/12; Y04S 10/14; Y02P 80/14
See application file for complete search history.

(56) References Cited

U.S. PATENT DOCUMENTS

| | | |
|---|---|---|
| 2014/0327404 A1* | 11/2014 | Markowz ................ H02J 7/007 320/128 |
| 2015/0380956 A1 | 12/2015 | Kaji |
| 2015/0381089 A1 | 12/2015 | Tarnowski |
| 2016/0190806 A1 | 6/2016 | Taimela et al. |
| 2017/0229870 A1 | 8/2017 | Singh et al. |

FOREIGN PATENT DOCUMENTS

| | | |
|---|---|---|
| KR | 10-1566296 B1 | 11/2015 |
| KR | 10-1697348 B1 | 1/2017 |

\* cited by examiner

METHOD FOR CONTROLLING ESS OUTPUT

FIELD OF THE INVENTION

The present invention relates to a method of controlling power output of an energy storage system or ESS depending on droop control according to frequency variation range of a power grid; and more particularly to, the method of controlling the output of the ESS for an independent hybrid power supply system in an area such as an island.

BACKGROUND OF THE INVENTION

In islands or remote places where commercial power is not supplied, small or medium-sized diesel power plants or steam or gas turbine power plants are generally used as power supply systems. In addition to diesel power generators for supplying power, there are many cases that power is supplied in combination with renewable energy or renewable energy sources such as photovoltaic power generators, wind power generators, or energy storage systems for the purpose of saving fuel and reducing noise and pollution and these are so-called hybrid power supply systems or independent microgrids.

For example, the independent microgrids are composed in a form of adding a wind power generator, a photovoltaic power generator, or an ESS to a diesel generator.

In such an independent microgrid, an ESS largely plays two roles, of which one is to improve stability to get rid of system instability that may occur if there is a renewable energy source introduced with higher load or capacity than that of a diesel generator and the other is to store energy to overcome time difference between time of generating renewable energy source and time of using load.

Particularly, in case of the latter, if a great amount of photovoltaic power is generated at light load conditions at daytime, the generated amount of the photovoltaic power may be charged and then discharged at night time. Therefore, as it is possible to stop operation of a diesel generator or reduce load, it may have more advantages such as cutting fuel costs.

By the way, when alternating current power is supplied to such an independent microgrid operated with an ESS and a diesel generator by applying droop control, there is a problem that power oscillation of a power grid occurs due to gap between slow response of a diesel generator and quick response of a ESS by change in grid frequency during load change.

DETAILED EXPLANATION OF THE INVENTION

Technical Problems

The object of the present invention is to provide a method of controlling output of an ESS that is capable of preventing power oscillation of a power grid caused by gap between slow response of an engine generator and quick response of an ESS upon droop control in an independent microgrid in an area such as an island.

The other object of the present invention is to provide a method of controlling output of an ESS that is capable of stabilizing frequency of an independent microgrid.

Means of Solving the Problem

A method of controlling output of an ESS depending on droop control according to frequency variation range of a power grid in accordance with one aspect of the present invention comprises steps of: monitoring the frequency variation range of the power grid; predicting frequency correction range resulting from regulation of an engine generator during a predetermined unit regulation time if the frequency variation range is determined to exceed a first reference value; controlling the output of the ESS with an output value determined by a frequency of the power grid according to a droop control algorithm set as a default if the predicted frequency correction range does not exceed a second reference value; and fixing the output of the ESS during the unit regulation time if the predicted frequency correction range exceeds the second reference value.

Herein, after the step of controlling the output of the ESS according to the default droop control algorithm, steps of monitoring frequency variation range of the power grid; calculating frequency correction range resulting from regulation of an engine generator during the predetermined unit regulation time if the frequency variation range is determined to exceed the first reference value; controlling the output of the ESS as an output value determined by a frequency of the power grid according to a droop control algorithm set as a default if the calculated frequency correction range does not exceed a third reference value; and fixing the output of the ESS during next unit regulation time if the calculated frequency correction range exceeds the third reference value may be further comprised.

Herein, after the step of fixing the output of the ESS, steps of monitoring the frequency variation range of the power grid; calculating frequency variation range resulting from regulation of the engine generator during the predetermined unit regulation time if the frequency variation range is determined to exceed the first reference value; controlling the output of the ESS with an output value determined by frequency of the power grid according to a droop control algorithm set as a default if the calculated frequency variation range does not exceed a third reference value; and fixing the output of the ESS during next unit regulation time if the calculated frequency variation range does not exceed the third reference value may be further comprised.

Herein, a step of storing the calculated frequency variation range resulting from the regulation of the engine generator may be further included, and at the step of predicting frequency correction range resulting from regulation of the engine generator, the frequency variation range may be predicted according to the frequency variation range stored at the previous step of storing the frequency variation range under the performance of droop control.

Herein, the second reference value may be determined depending on the frequency variation range of the power grid at a point of time when the frequency variation range thereof is monitored to exceed the first reference value and power of the power grid at the point of time.

Herein, at the step of monitoring the frequency variation range of the power grid, the frequency variation range after a certain time may be determined in advance based on frequency change gradient of the power grid.

Herein, a cycle time of performing the step of monitoring the frequency variation range of the power grid may be equal to the unit regulation time.

Herein, a cycle time of performing the step of monitoring the frequency variation range of the power grid may be an integer multiple of the unit regulation time.

Herein, the step of monitoring the frequency variation range of the power grid includes steps of: checking a gradient of a frequency value of the power grid during a gradient-measuring time at an early stage of monitoring;

calculating the frequency of the power grid at an endpoint of the monitoring cycle and predicting the frequency variation range thereto; and waiting, if the predicted frequency variation range is smaller than the first reference value, until next monitoring time depending on the monitoring cycle.

Effects of the Invention

A method of controlling output of an ESS in accordance with the present invention with the aforementioned configuration, if it is implemented, has an advantage of stabilizing frequency in an independent microgrid in an area such as an island.

In addition, the present invention has an advantage of effectively preventing power oscillation of a power grid caused by slow response and inertia of droop control of an engine generator included in an independent microgrid.

DETAILED DESCRIPTION OF THE PREFERRED EMBODIMENTS

Detailed example embodiments to implement the present invention will be explained below by referring to attached drawings.

Upon explanation of the present invention, terms such as "a first," "a second," etc. may be used to explain a variety of components but the components may not be limited by such terms. The terms are used only for the purpose of distinguishing one component from another. For example, a first component may be named as a second component without being beyond the scope of the right of the present invention and similarly, even a second component may be named as a first one.

If it is mentioned that a component is connected or linked to another component, it may be understood that the component may be directly connected or linked to the another component but also a third component may exist in between them.

The terms used in this specification are used only to explain specific example embodiments and they are not intended to limit the present invention. Unless a context clearly indicates a different meaning, any reference to singular may include plural ones.

In this specification, it may be understood: that terms such as "include," or "equip" are intended to designate that features, numbers, steps, movements, components, parts, or their combinations exist; and that existence or addibility of one or more other features, numbers, steps, movements, components, parts, or their combinations are not excluded in advance.

Besides, shapes, sizes, etc. of elements in drawings may be exaggerated for clearer explanation.

Figure 1:
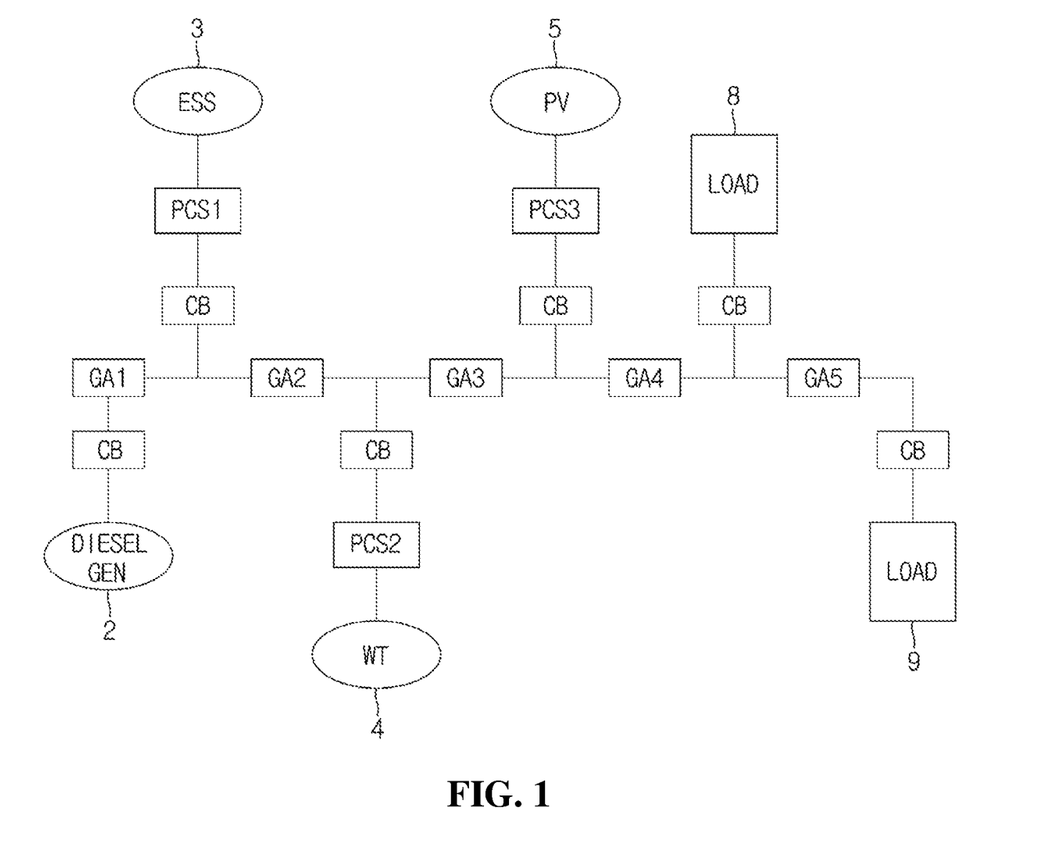
FIG. 1 is a block diagram illustrating a power supply system that may use a method of controlling output of an ESS in accordance with a thought of the present invention.

FIG. 1 illustrates a power supply system that may use a method of controlling output of an ESS in accordance with a thought of the present invention.

The illustrated power supply system may be implemented at a site which has to have an independent power supply system in an area such as an island, without being directly connected to central power transmission and distribution systems of a country. While forming an independent power grid and having frequent change in load 8 and 9, the illustrated power supply system shows higher rates of power generation from renewable energy generating equipment such as a wind power generator 4 or photovoltaic power generation equipment 5 that may show drastically changed and unpredictable power generation quantity.

The illustrated power supply system has the load 8, and 9 and an ESS 3 to supply power of a power grid stably in preparation for variations of power generation and has a diesel generator 2 as an engine generator that generates power at a standard frequency of 60 Hz to maintain the frequency of the power grid as the standard frequency.

Figure 2A:
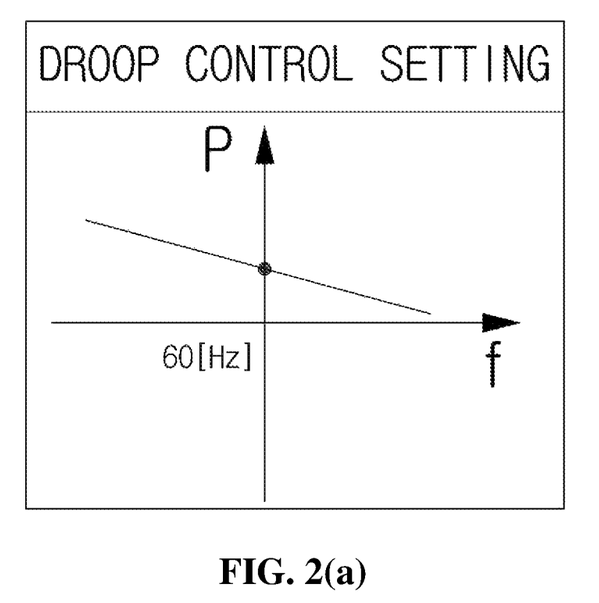
FIG. 2(a) is a graph illustrating a droop control aspect of a normal diesel generator and FIG. 2(b) is a graph illustrating a droop control aspect of a normal ESS.

But alternating current frequency of the power grid depends on the diesel generator 2 which is an engine generator. As illustrated in FIG. 2(a), a diesel generator generally has only a circuit breaker or CB is directly connected to the power grid, instead of being connected with a separate power conditioning system (PCS). A controller for the diesel generator reduces fuel quantity if frequency of the power grid becomes high and performs droop control in a method of increasing fuel quantity if the frequency of the power grid becomes low.

Figure 2B:
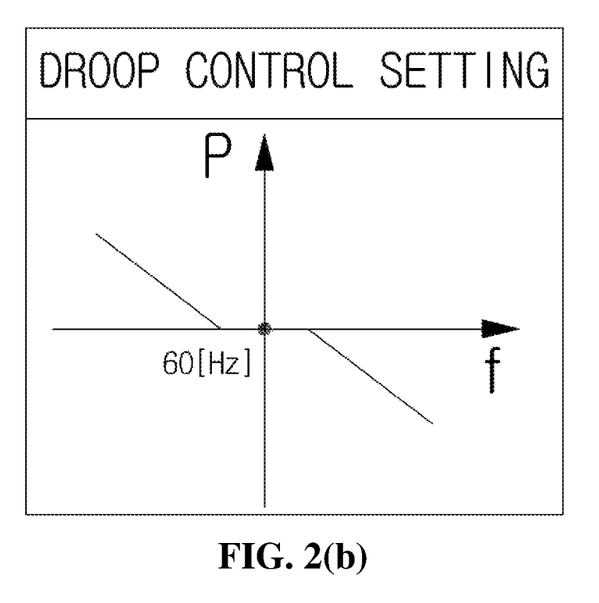

Meanwhile, the ESS 3 also performs droop control to stabilize the frequency of the power grid. As illustrated in FIG. 2(b), if the frequency of the power grid is located within certain positive or negative bandwidth at the standard frequency of 60 Hz, droop control of the power of the normal ESS 3 is not performed in the power grid. However, if the frequency increases in excess of the bandwidth, the supply of the power to the power grid is reduced inversely proportional to the increase of the frequency (if the supply of the power of the ESS is 0 or charged, as much power is more charged) and if the frequency decreases by less than the bandwidth, the supply of the power to the power grid is increased inversely proportional to the decrease of the frequency.

At the time, because the gap between response of droop control of the diesel generator 2 and that of the ESS 3 with a separate power conditioning system (PCS) as PCS 1 is too big, oscillation resulting from droop control of both the diesel generator 2 and the ESS 3 as the case may be, may occur.

Figure 3:
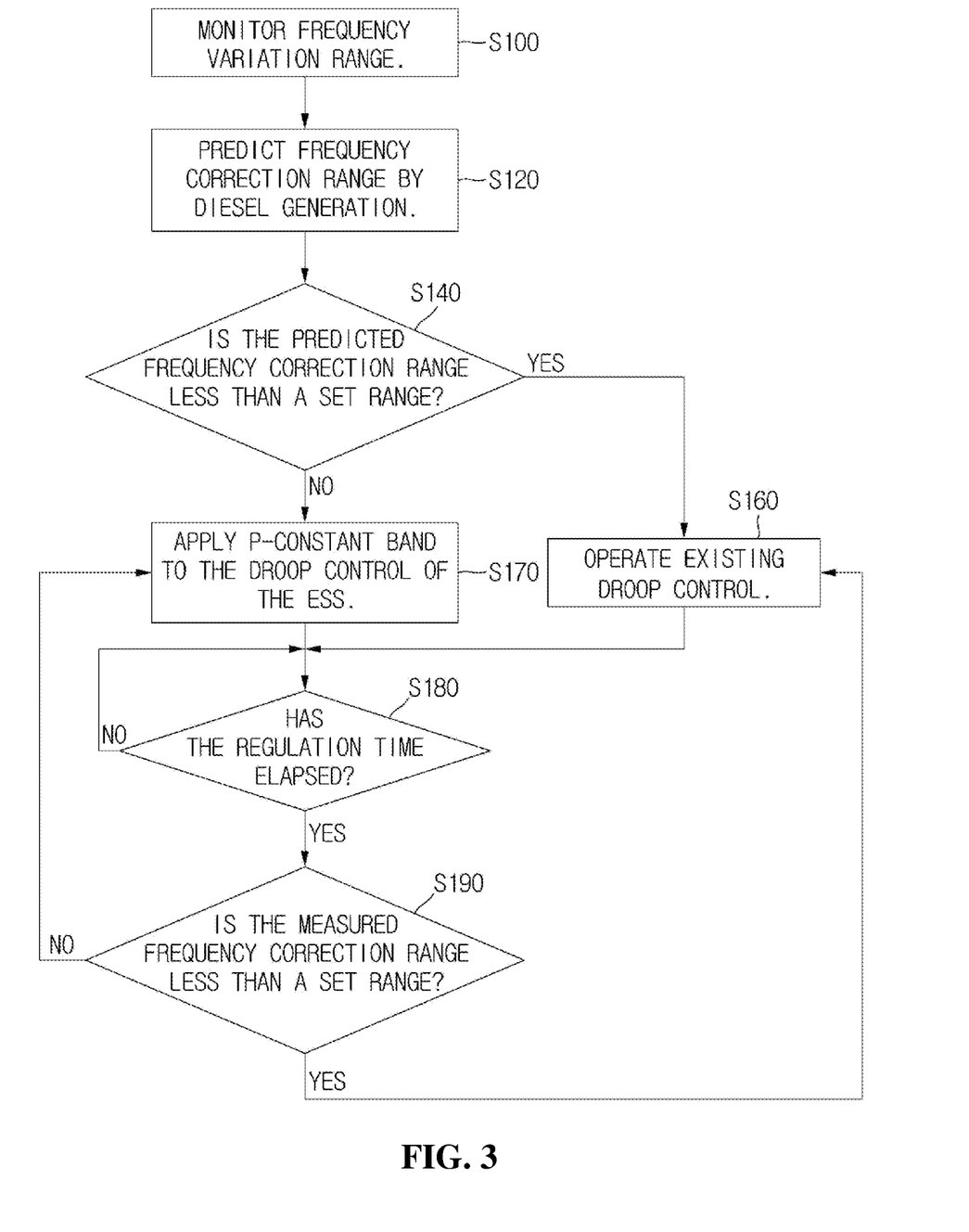
FIG. 3 is a flowchart illustrating a method of controlling output of an ESS that performs droop control in accordance with one example embodiment of the present invention.
Figure 4:
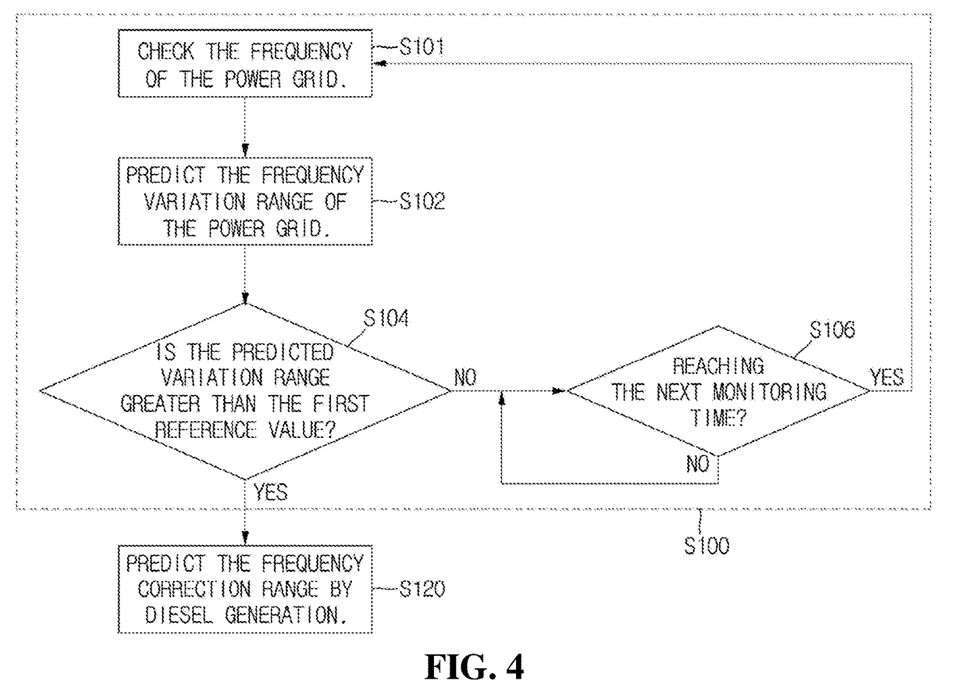
FIG. 4 is a flowchart more specifically illustrating a step S100 in FIG. 3.

FIG. 3 illustrates one example embodiment of a method of controlling output of an ESS depending on droop control in accordance with a thought of the present invention to prevent the oscillation and FIG. 4 illustrates a step S100 of FIG. 3 more specifically.

The illustrated method of controlling the output of the ESS basically controls output of the ESS according to frequency variation range of a power grid.

The illustrated method of controlling the output of the ESS comprises steps of: regularly monitoring the frequency variation range of a power grid at S100; predicting, if the frequency variation range is determined to exceed a first reference value at S140, frequency correction range resulting from regulation of an engine generator during a predetermined unit regulation time at S120; controlling, if the predicted frequency correction range does not exceed a second reference value at S140, the output of the ESS with an output value determined by a frequency of the power grid according to a droop control algorithm set as a default at S160; and fixing, if the predicted frequency correction range exceeds the second reference value, the output of the ESS during the unit regulation time at S170.

Herein, frequency variations mean change of frequency of the power grid due to increase or decrease of load connected to the power grid or an accident of a generator and frequency correction means change of frequency of the power grid resulting from change of power supply of an engine generator or an ESS to the power grid to mitigate the frequency in response to the frequency variation.

Herein, the first reference value is to determine increase or decrease of load enough to give a variation to frequency of the power of the power grid and the second reference value is to determine variations, i.e., corrections, of the frequency of the power grid caused by a normal engine generator which performs droop control according to frequency variations of the power grid power.

Herein, steps S140 and S160/S170 are repeated during next unit regulation time and repetitions are applied by using a value actually measured during a previous unit regulation time without predicting the frequency correction range by regulation of the engine generator at S190. The repetition process is performed until the frequency variation range of the power grid enters a stabilization bandwidth not requiring droop control to which P-Constant Band is applied.

Meanwhile, during the repetition process, a process after the step of controlling the output of the ESS according to the default droop control algorithm at S160 may be implemented, after the elapse of the unit regulation time at S180, with steps of: calculating frequency correction range resulting from regulation of an engine generator during the predetermined unit regulation time at S190 if the frequency variation range is determined to exceed the first reference value; controlling the output of the ESS as an output value determined by a frequency of the power grid according to a droop control algorithm set as a default (returning to S160) if the calculated frequency correction range does not exceed a third reference value; and fixing the output of the ESS during next unit regulation time (moving to S170) if the calculated frequency correction range exceeds the third reference value.

Similarly, a process after the step of fixing the output of the ESS during the repetition process at S170 may be implemented, after the elapse of the unit regulation time at S180, with steps of: calculating frequency variation range resulting from regulation of the engine generator during the predetermined unit regulation time at S190 if the frequency variation range is determined to exceed the first reference value; controlling the output of the ESS with an output value determined by frequency of the power grid according to a droop control algorithm set as a default (moving to S160) if the calculated frequency variation range does not exceed a third reference value; and fixing the output of the ESS during next unit regulation time (returning to S170) if the calculated frequency variation range does not exceed the third reference value.

According to the implementation, the third reference value may be determined in a slightly different method from, or in the same method to, the second reference value.

Meanwhile, after the application of the P-Constant Band, when a situation of applying a next P-Constant Band occurs, the calculated frequency correction range resulting from the regulation of the engine generator at S190 may be stored in a separate storage such as flash memory to be supporting data to predict frequency variation range by controlling the engine generator at the step S120. For this, after the step S190 in the drawing, a step of storing the calculated frequency variation range resulting from the regulation of the engine generator may be further included.

In this case, at the step S120 of predicting frequency correction range resulting from regulation of the engine generator when the situation of applying a next P-Constant Band occurs, the frequency variation range may be predicted by applying the frequency variation range (e.g., average value of frequent variation ranges respectively measured at several times of previous droop controls) stored at the previous step of storing the frequency variation range according to the performance of the droop control process.

The step S100 of monitoring the frequency variation range of the power grid is advantageous to be regularly performed at a specified time interval. If the frequency of the power grid ordinarily stays at stabilization bandwidth that does not require application of the P-Constant Band, system resources could be unnecessarily wasted too frequently to predict or actually measure frequency variation range. For example, in case of a power generation system where renewable energy generation and engine generation are integrated in normal areas such as islands, it may be performed at one-second intervals.

At the step S100 of monitoring the frequency variation range of the power grid, by using a method of determining the frequency variation range of the power grid, actual frequency variation range by a value of actually measuring the frequency of the power grid or predicted frequency variation range after a certain time may be determined.

The former case has an advantage of determining really accurate frequency variation range because the value is an actually measured value, but has a disadvantage of failing to immediately stabilize the frequency of the power grid to perform regulation of generation quantity at the point of time of actual measurement. Furthermore, in case of controlling a diesel generator whose response resulting from droop control is slow, given that most droop control to which P-Constant Band is applied is performed with predicted frequency variation range, it has a negative disadvantage even in the aspect of coordination with the whole power generation system.

The latter case has an advantage of stabilizing the frequency of the power grid more immediately and as a predictable plan, it is possible to determine the frequency variation range in advance after a certain time based on frequency change gradient of the power grid. In other words, it is possible to predict a frequency value of the power grid at an endpoint of the monitoring cycle by applying the gradient of the frequency value of the power grid during a relatively short time of measuring gradient in an early monitoring stage (e.g., if the monitoring cycle is one second, for 0.05 second at the early monitoring stage) to the other monitoring cycles, and determine frequency variation range with the power grid frequency value at the predicted endpoint.

FIG. 4 is more specified step S100 of the latter case. As illustrated, the step S100 of monitoring the frequency variation range of the power grid may include steps of: checking a gradient of a frequency value of the power grid during a gradient-measuring time at an early stage of monitoring at S101; calculating the frequency of the power grid at an endpoint of the monitoring cycle and predicting the frequency variation range thereto at S102; and waiting, if the predicted frequency variation range is smaller than the first reference value, until next monitoring time depending on the monitoring cycle at S160.

In accordance with the implementation, a cycle time of performing the step S100 of monitoring the frequency variation range of the power grid may be same to the unit regulation time or a cycle time of performing the step of monitoring the frequency variation range of the power grid may be set to be an integer multiple of the unit regulation time.

Meanwhile, the former case has an advantage of making the process more simple and easier to implement and having less hardware burden while its accuracy of droop control is low and the latter case has an advantage of having high accuracy of droop control even though the implementation is more complicated and there is slightly high hardware burden.

However, in both the former and the latter cases, the unit regulation time is more advantageous to be similar to the cycle of the droop control performed itself by the engine generator connected to the power grid.

In accordance with the implementation, it is advantageous that the second reference value has a different value depending on each of various situations without being fixed.

For example, if there occurs a great frequency variation of the power grid requiring droop control, the second reference value may have a different value depending on the frequency variation range. It is because the response speed of the output of the engine generator is different depending on the frequency variation range and the burden rate of the engine generator may be changed to stabilize the power grid in the long term.

Figure 5:
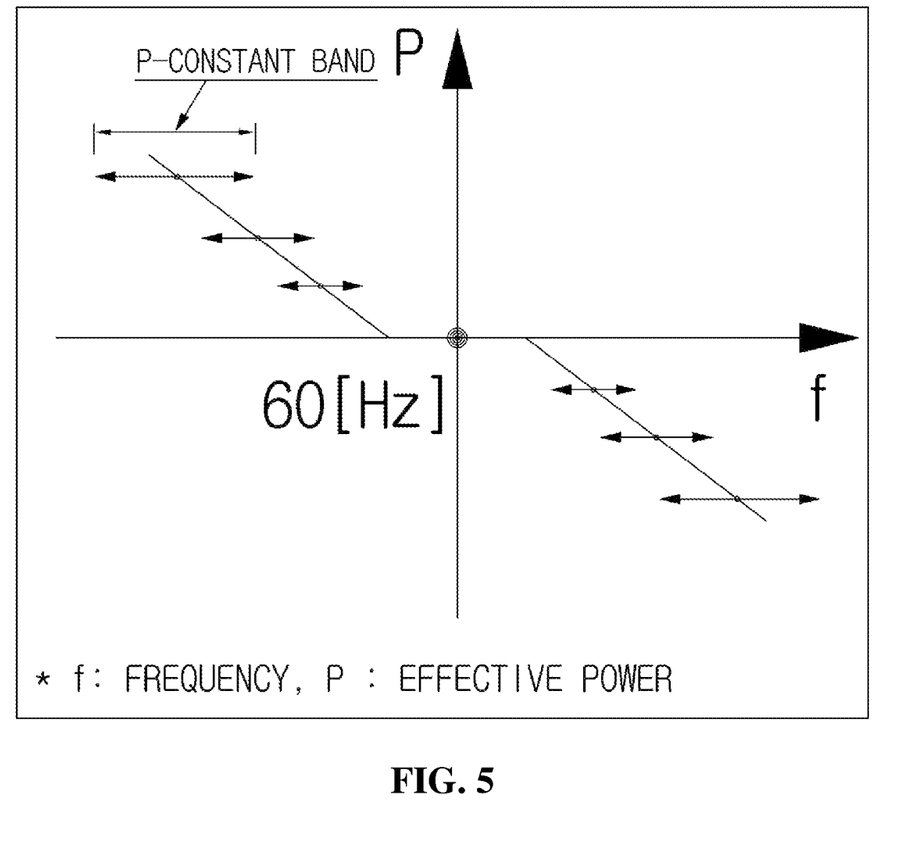
FIG. 5 is a graph illustrating a droop control aspect of an ESS in accordance with a thought of the present invention.

The immediate response with an ESS to a great frequency variation due to sharp increase in load contributes on stabilizing the frequency of the power grid, but the battery life time of the ESS is significantly reduced. Accordingly, it is common to indicate the tendency that when the frequency variation range of the power grid is greater, the second reference value becomes larger. As shown above, FIG. 5 illustrates an aspect that the second reference value has a larger value when the frequency variation range of the power grid that leads droop control is greater. In FIG. 5, the second reference value is granted as P-constant band in the droop control graph.

In accordance with the implementation, on assumption that there are great variations of the frequency of the grid requiring droop control under which variation values are negative and plus values and their absolute value is same, the second reference value if the variation value is a positive absolute value and that if the variation value is a negative absolute value may be set differently. These result from the consideration of the fact that the response speed of the engine generator that reduces its power by reducing the fuel injection volume is slightly faster than the speed of the engine generator that increases the output by increasing the fuel injection volume.

Moreover, the second reference value may be differently determined depending on the actually measured or predicted frequency variation range of the power grid, and the power of the power grid at the time when a great frequency variation of the power grid requiring droop control occurs. This is for the purpose of reflecting that if the quantity of power of the power grid is large, it is required to input (or output) more quantity of the power to stabilize the frequency regardless of the same frequency variations occurring due to the large quantity of power and the small quantity of power.

Furthermore, depending on cases when the engine generator had constant output (i.e., the early stage of droop control in accordance with the present invention), when the engine generator was increasing the power by performing droop control, and when the engine generator was reducing the power by performing droop droop control, a formula or table for determining the second reference value may be configured differently.

In addition, depending on cases when the engine generator had constant output (i.e., the early stage of droop control in accordance with the present invention), when the power of the output of the engine generator with droop control is expected to be controlled in the same direction as the direction for regulating the power and when it is expected to be controlled in the different direction from the direction for regulating the power, a formula or table for determining the second reference value may be configured differently.

Besides, for example, depending on cases when the engine generator had constant output (i.e., the early stage of droop control in accordance with the present invention), when the engine generator that increased the power with the droop control is expected to continuously increase the power, when the engine generator that increased the power with the droop control is expected to reversely reduce the power, and when the engine generator that reduced the power with the droop control is expected to continuously reduce the power, a formula or table for determining the second reference value may be configured differently.

As shown above, the frequency variation range and power of the power grid, and the state of the engine generator, as parameters to determine the second reference value, may be applied and a method of determining the second reference value may be determined with formulas composed of the parameters or with values resulting from a table as a reference value searched by the parameters.

It must be noted that the aforementioned example embodiments are just for explanation and not for limitation. In addition, those skilled in the art to which the present invention pertains could understand that various example embodiments may be formed in the scope of the technical idea of the present invention.

REFERENCE NUMERALS

2: Diesel (engine) generator
3: ESS
4: Wind power generator
5: Photovoltaic power generator
8, 9: Load

INDUSTRIAL AVAILABILITY

The present invention relates to a method of controlling output of power of an ESS and it is available in an ESS field.

What is claimed is:

1. A method of controlling output of an energy storage system (ESS) depending on droop control according to a frequency variation range of a power grid, comprising the steps of:
monitoring the frequency variation range of the power grid;
predicting a frequency correction range resulting from regulation of an engine generator during a predetermined unit regulation time if the frequency variation range is determined to exceed a first reference value;
controlling the output of the ESS with an output value determined by a frequency of the power grid according to a droop control algorithm set as a default if the predicted frequency correction range does not exceed a second reference value; and fixing the output of the ESS during the predetermined unit regulation time if the predicted frequency correction range exceeds the second reference value, wherein, after the step of controlling the output of the ESS according to the default droop control algorithm, the method further comprises the steps of:

monitoring the frequency variation range of the power grid;

calculating a frequency correction range resulting from the regulation of the engine generator during the predetermined unit regulation time if the frequency variation range is determined to exceed the first reference value;

controlling the output of the ESS as the output value determined by the frequency of the power grid according to the droop control algorithm set as the default if the calculated frequency correction range does not exceed a third reference value; and fixing the output of the ESS during a next unit regulation time if the calculated frequency correction range exceeds the third reference value.

2. The method of claim 1, further including the step of storing the calculated frequency variation range resulting from the regulation of the engine generator, wherein, at the step of predicting the frequency correction range resulting from the regulation of the engine generator, the frequency variation range is predicted according to the frequency, variation range stored at the previous step of storing the frequency variation range under a performance of the droop control.

3. The method of claim 1, wherein, depending on the frequency variation range of the power grid at a point of time when the frequency variation range thereof is monitored to exceed the first reference value and power of the power grid at the point of time, the second reference value is determined.

4. The method of claim 1, wherein, at the step of monitoring the frequency variation range of the power grid, the frequency variation range after a certain time is determined in advance based on a frequency change gradient of the power grid.

5. The method of claim 1, wherein a cycle time of performing the step of monitoring the frequency variation range of the power grid is equal to the unit regulation time.

6. The method of claim 1, wherein a cycle time of performing the step of monitoring the frequency variation range of the power grid is an integer multiple of the unit regulation time.

7. A method of controlling output of an energy storage system (ESS) depending on droop control according to a frequency variation range of a power grid, comprising the steps of:

monitoring the frequency variation range of the power grid;

predicting a frequency correction range resulting from regulation of an engine generator during a predetermined unit regulation time if the frequency variation range is determined to exceed a first reference value;

controlling the output of the ESS with an output value determined by a frequency of the power grid according to a droop control algorithm set as a default if the predicted frequency correction range does not exceed a second reference value; and fixing the output of the ESS during the predetermined unit regulation time if the predicted frequency correction range exceeds the second reference value, wherein, after the step of fixing the output of the ESS, the method further comprises the steps of:

monitoring the frequency variation range of the power grid;

calculating the frequency variation range resulting from the regulation of the engine generator during the predetermined unit regulation time if the frequency variation range is determined to exceed the first reference value;

controlling the output of the ESS with the output value determined by the frequency of the power grid according to the droop control algorithm set as the default if the calculated frequency variation range does not exceed a third reference value; and fixing the output of the ESS during a next unit regulation time if the calculated frequency variation range does not exceed the third reference value.

8. The method of claim 7, further including the step of storing the calculated frequency variation range resulting from the regulation of the engine generator, wherein, at the step of predicting the frequency correction range resulting from the regulation of the engine generator, the frequency variation range is predicted according to the frequency variation range stored at the previous step of storing the frequency variation range under a performance of the droop control.

9. A method of controlling output of an energy storage system (ESS) depending on droop control according to a frequency variation range of a power grid, comprising the steps of:

monitoring the frequency variation range of the power grid;

predicting a frequency correction range resulting from regulation of an engine generator during a predetermined unit regulation time if the frequency variation range is determined to exceed a first reference value;

controlling the output of the ESS with an output value determined by a frequency of the power grid according to a droop control algorithm set as a default if the predicted frequency correction range does not exceed a second reference value; and fixing the output of the ESS during the predetermined unit regulation time if the predicted frequency correction range exceeds the second reference value, wherein the step of monitoring the frequency variation range of the power grid includes the steps of:

checking a gradient of a frequency value of the power grid during a gradient-measuring time at an earlier stage of monitoring;

calculating the frequency of the power grid at an endpoint of a monitoring cycle and predicting the frequency variation range thereto; and waiting, if the predicted frequency variation range is smaller than the first reference value, until a next monitoring time depending on the monitoring cycle.

* * * * *